United States Patent
Ritter et al.

(10) Patent No.: US 9,435,506 B2
(45) Date of Patent: Sep. 6, 2016

(54) LIGHTING DEVICE IN A MOTOR VEHICLE HAVING A PLATE-SHAPED LIGHT CONDUCTOR AND A ROD-SHAPED LIGHT CONDUCTOR

(71) Applicant: Automotive Lighting Reutlingen GmbH, Reutlingen (DE)

(72) Inventors: Michael Ritter, Reutlingen (DE); Kurt Schuster, Reutlingen (DE); Pablo Sanchez Bodega, Stuttgart (DE)

(73) Assignee: Automotive Lighting Reutlingen GmbH, Reutlingen (DE)

(*) Notice: Subject to any disclaimer, the term of this patent is extended or adjusted under 35 U.S.C. 154(b) by 102 days.

(21) Appl. No.: 14/306,631

(22) Filed: Jun. 17, 2014

(65) Prior Publication Data
US 2014/0376245 A1 Dec. 25, 2014

(30) Foreign Application Priority Data
Jun. 20, 2013 (DE) .................. 10 2013 211 718

(51) Int. Cl.
*F21S 8/10* (2006.01)
*B60Q 1/26* (2006.01)
*B60Q 1/00* (2006.01)

(52) U.S. Cl.
CPC ......... *F21S 48/2243* (2013.01); *B60Q 1/0041* (2013.01); *B60Q 1/2607* (2013.01);
(Continued)

(58) Field of Classification Search
CPC ............. F21S 48/2237; F21S 48/2243; F21S 48/2262; F21S 48/2281; F21S 8/10; F21S 48/1241; F21S 48/1323; F21S 48/1329; F21S 48/2225–48/2293; F21S 48/236; B60Q 1/0035; B60Q 1/0041; B60Q 1/0047; B60Q 3/002–3/005; B60Q 3/0289; B60Q 1/0011
See application file for complete search history.

(56) References Cited

U.S. PATENT DOCUMENTS 3,840,851 A * 10/1974 Fowler ................ B60Q 1/2603
                                                          315/77
2002/0093829 A1 * 7/2002 Pinson ................. F21S 48/1154
                                                         362/520

(Continued)

FOREIGN PATENT DOCUMENTS

DE         10034452 A1     1/2002
DE   10 2008 008 180 A1     8/2009

(Continued)

OTHER PUBLICATIONS

Official Report issued on Aug. 12, 2015 in German Patent App. No. 10 2014 211 847.3.

*Primary Examiner* — Andrew Coughlin
*Assistant Examiner* — Steven Horikoshi
(74) *Attorney, Agent, or Firm* — Howard & Howard Attorneys PLLC (57) ABSTRACT

The present invention relates to a lighting device in a motor vehicle. The lighting device includes a light source for emitting light and at least one plate-shaped light conductor, which is made in form of a block optics. The block optics includes two boundary surfaces which run opposite towards each other at a certain distance, a totally reflective side surface between the boundary surfaces, and a light coupling-out area arranged between the boundary surfaces. A coupling-in section is arranged on at least one of the boundary surfaces. The lighting device further includes at least one substantially rod-shaped light conductor with a light output area which extends along the longitudinal extension of the light conductor in addition to the at least one block optics.

15 Claims, 5 Drawing Sheets

(52) U.S. Cl.
CPC ......... *F21S 48/225* (2013.01); *F21S 48/2212* (2013.01); *F21S 48/2237* (2013.01); *F21S 48/2262* (2013.01); *F21S 48/2268* (2013.01); *F21S 48/2281* (2013.01); *F21S 48/2287* (2013.01)

(56) References Cited

U.S. PATENT DOCUMENTS

| | | | | |
|---|---|---|---|---|
| 2002/0131275 | A1* | 9/2002 | Yamamoto | F21S 9/026 362/555 |
| 2004/0257790 | A1* | 12/2004 | Tanaka | B60Q 1/26 362/23.07 |
| 2005/0152153 | A1* | 7/2005 | Amano | F21S 48/215 362/520 |
| 2009/0154186 | A1* | 6/2009 | Natsume | B60Q 1/0041 362/516 |
| 2012/0069592 | A1* | 3/2012 | Natsume | B60Q 1/0052 362/511 |
| 2012/0075876 | A1 | 3/2012 | Dubosc | |
| 2013/0003399 | A1* | 1/2013 | de Lamberterie | F21S 48/115 362/511 |

FOREIGN PATENT DOCUMENTS

| | | |
|---|---|---|
| DE | 102008048764 A1 | 3/2010 |
| DE | 102008048751 A1 | 4/2010 |
| DE | 102011000038 A1 | 7/2012 |
| EP | 1881263 A1 | 1/2008 |

* cited by examiner

LIGHTING DEVICE IN A MOTOR VEHICLE HAVING A PLATE-SHAPED LIGHT CONDUCTOR AND A ROD-SHAPED LIGHT CONDUCTOR

CROSS-REFERENCE TO RELATED APPLICATION

This application is based on and claims priority to German Patent Application DE 102013211718.3 filed on Jun. 20, 2013.

BACKGROUND OF THE INVENTION

1. Field of Invention

The present invention relates to a lighting device in a motor vehicle.

2. Description of Related Art

Light conductor arrangements are known in the art for use with light functions in motor vehicles. The term "light function" may refer to the front area of the motor vehicle, for example in the realization of an indicator light, a day time running light, or a position light, as well as to the rear area of the motor vehicle, such as in the realization of a brake light, a rear light, an indicator light, a fog light, or a reverse light. The shape of a light conductor can be freely chosen, taking the requirements for the total internal reflection of the light in the light conductor into account, so that there is a great creative variety in the design of the lighting devices, in particular in the shape of the light output areas. Hereby, the objective is to achieve a relatively bright and particularly homogeneously illuminated light output area, despite the design varieties. The light that is coupled into the light conductor is usually produced using semiconductor light sources, preferably light emitting diodes (LEDs), whereby the light can be emitted by one single light emitting diode. However, it is also possible to use several light emitting diodes, for example, in the form of light emitting diode arrays.

Different kinds of light conductor types are known in the related art. Substantially rod-shaped light conductors are used with a cross-section that is preferably circular or elliptical, where the light incidence area is generally arranged on one end face on a free end of the light conductor. At least part of the circumferential surface of the light conductor forms the boundary surface for the total internal reflection and directs the coupled-in light along the longitudinal extension of the light conductor. Moreover, light coupling-out areas (which reflect incident light onto them into the direction of a light output area) can be arranged within the light conductor so that light can be emitted out of the light conductor through the output area. Depending on the design and arrangement of the light coupling-out areas of the light conductor, the light output area can be arranged either on one end face on a free end that is opposite of the first free end, or the light output area can extend alongside at least part of the longitudinal extension of the light conductor. With such elongated light conductors, it is problematic to homogeneously illuminate the light output area which extends at least over part of the longitudinal extension.

Plate-shaped light conductors are also known in the art, and are sometimes referred to as "block" optics, which generally include two walls arranged opposite to each other at a certain distance and which serve as boundary surfaces. Narrow sides of the block optics are usually arranged orthogonal towards the boundary surfaces. At least a first section of the narrow sides serves as a light coupling-out area. Another section of the narrow sides of the block optics, in particular a section located at least partially opposite of the first section, serves as a totally reflective side area. Further sections of the narrow sides between the first and the other section can serve as additional boundary surfaces for a total internal reflection of the coupled-in light. When viewed from above, the contour of the block optics can be arranged in almost any suitable way, and can be adapted to the optical requirements for the block optics. Thus, the block optics can be formed, by way of non-limiting example, as rectangular, round, elliptical, or parabolic at least in a partial section. The contour can essentially follow any free-form. Further, a block optics is advantageous in that it can be used for producing a large, homogeneously illuminated area, and allows for a particularly efficient coupling-in of the light emitted from the light source. Further, coupling-in sections designed in a different manner are similarly conceivably, whereby light can be coupled into the block optics.

In the block optics, a light incidence area can be arranged in a deepening within the plate-shaped element for the light that is being emitted by the light source, which is arranged into one of the boundary surfaces that are located opposite of each other. The deepening can accommodate the semiconductor light source. At least part of the wall of the deepening serves as light incidence area. In a parabolic alignment of the block optics contour, when viewed from above, the light source or the deepening is preferably arranged within the focal point of the parabola. To that end, basically parallel light is emitted out of the block optics via the light coupling-out area. Such a block optics is known from EP 2169296 A1, which includes a plate-shaped transparent element with a parabolic form or a parabolic-like form, when viewed from above. However, this block optics can only achieve the desired homogeneous illumination of the light coupling-out area if it is designed in an even way, formed as an even plate. In such a case, the light coupling-out area is essentially arranged in a rectangular way. If the block optics is designed in a curved shape, in the shape of a hollow cylinder section or of a spherical segment, then the light in the block optics, which is propagated towards the light coupling-out area is pushed towards the outer one of the two oppositely located walls with regards to the curving, so that a particularly bright area results on the outer area of the light coupling-out area. Thus, in a curved or spherical block optics, the illuminated light coupling-out area features the shape of a ring segment. Thus, it is not possible to achieve a homogeneous illumination of the total light coupling-out area with a curved or spherical block optics. Therefore, the known block optics cannot be used, or can only be partially used to accomplish ring-shaped or ring section-shaped illumination areas (for example, to create light rings which surround a light module or a lens of a projector module, or of curved or arched illumination areas in the lighting device).

Thus, the objective of the invention is to provide a lighting device or a light conductor arrangement that can achieve an illuminated light coupling-out area that is as homogeneous as possible, for mainly straight light coupling-out areas, but also for any curved or arched light coupling-out areas.

SUMMARY OF THE INVENTION

The lighting device of the present invention overcomes the disadvantages in the related art in a lighting device having at least one block optics and at least one rod-shaped light, so that the respective advantages of the block optics and those of the rod-shaped light conductor can be combined in one single lighting device. In order to produce rectangular, straight light areas, the at least one block optics is used, which can achieve a particularly homogeneous illumination of the light coupling-out area on the one hand, and on the other hand also relatively high illumination values. The block optics is thus particularly well suited for producing bright light functions, such as for example, a brake light or an indicator light. Other light functions, which do not demand such high illumination values under government requirements (such as ECE-regulations), such as light functions, may be implemented with at least one rod-shaped light conductor. Further, the at least one rod-shaped light conductor is particularly well suited for creating curved, ring-shaped, or ring section-shaped light areas. Hereby, the illuminated light output area preferably extends at least along a part of the longitudinal extension of the light conductor. For this, the rod-shaped light conductor can be designed with a cross section that is round, elliptical, or in any other shape. In combining rod-shaped light conductors and block optics, a high flexibility of the light area with regards to its shape (contour and course) can be achieved, which thus makes the creation of particularly flat and very complex light conductor arrangement possible, as well as with individual appearance.

The coupling section of the block optics may include a deepening in at least one of the boundary surfaces in which the at least one light source is arranged, whereby at least part of a wall of the deepening forms the light incidence area for the light emitted from the at least one light source. Alternatively, the coupling section of the block optics may include an optical deflector that is arranged within one of the boundary surfaces and a light coupling-in location on the opposite side of the boundary surface, so that light which is emitted from the at least one light source enters into the block optics via the light coupling-in location and is there directed into the layer of the block optics by the optical deflector.

In one embodiment, the light coupling-out elements are arranged in such a way within the rod-shaped light conductor, that they distribute light within the light output area, which is arranged along the longitudinal extension of the light conductor. In this way, light can be emitted along the entire length of the light output area of the rod-shaped light conductor. The light coupling-out elements are preferably aligned in such a way towards the shape of the light conductor and/or towards the embodiment of the light output area, that the coupled-out light illuminates the light emission area as homogeneously as possible. At times, it may not be possible to accomplish this in such a fine way as, for example, with an even parabolic-shaped block optics, but still improved over an arched or curved parabolic-shaped block optics with a ring-shaped or ring section-shaped light output area. The light output direction of the light conductor is preferably arranged orthogonally with regards to the longitudinal direction of the light conductor. If necessary, the light output area can be formed to be very narrow and flexibly arched or curved, whereby light can be emitted along the entire longitudinal extension of the light conductor or a certain part of it, so that for example, a light strip, for example, for producing a daytime running light can be accomplished.

The lighting device of the invention preferably serves for creating light functions (for example, indicator light, position light, parking light, daytime running light, brake light, rear light, reverse light, etc.) in a motor vehicle. However, it is also possible that the lighting device can be used for creating headlight functions (for example, low beam, high beam, partial main beam light, marking light, fog light, curve light, adaptive highbeam light, etc.). The light function can be either produced by the rod-shaped light conductor alone, or in combination with the block optics. Similarly, the headlight function can be produced either by the block optics alone, or in combination with the rod-shaped light conductor. Moreover, it is conceivable that a rod-shaped light conductor of the lighting device could fulfill one light function, and a block optics of the lighting device could fulfill a headlight function.

Advantageously, the at least one rod-shaped light conductor is used to produce arched and curved light areas within the lighting device, whereas the at least one block optics is otherwisde used to produce even light areas. Overall, a lighting device is provides that can produce an illuminated area of almost any shape and with a particularly high efficiency and an especially homogeneous illumination. The rod-shaped light conductor or its light output area can be arched or curved in almost any possible way. The only limitations is that the light which is coupled into the rod-shaped light conductor has to be propagated along the longitudinal extension of the light conductor with total internal reflection which, for example, cannot be guaranteed when the bend is too tight.

In one embodiment, the light output area of the rod-shaped light conductor is bent at least in a certain section in a plane that runs perpendicular to the main light output direction of the light conductor. Hereby, the main light output directions of the rod-shaped light conductor run basically parallel to each other. Alternatively it is suggested that the light output area of the rod-shaped light conductor is bent at least in a certain section within a plane that is included in the main light output direction of the light conductor, so that the main light output directions of the light conductor diverge. Thus, it is possible, that the light output area can follow the shape of a housing or cover screen of the lighting device.

In one embodiment, the particular light conductor arrangement in the lighting device of the invention makes it possible for at least one rod-shaped light conductor and the at least one block optics to produce different light functions. Thus, light conductor arrangement made up of the combination of the at least one block optics and the at least one rod-shaped light conductor is capable of producing different light or lamp functions in different sections of the light conductor arrangement or of its couple-out-light or light-output area. Moreover it is possible to produce a reverse light with a first block optics, a brake light with a second block optics directly adjoined to it, and a rear light with a further adjoined rod-shaped light conductor, all within one rear lamp.

Further, one single block optics can produce a bright brake light. By dimming the light source(s) arranged to this block optics, it is possible that the same block optics can produce a rear light in a different operating mode with a reduced intensity, compared to the brake light. To that end, when the brake pedal in the motor vehicle is pressed, a bright brake light is produced; and when the brake pedal is released while the rear light is switched on, then the light source is merely dimmed. The result is a compact multifunctional lighting device.

Advantageously, one light source is assigned to the at least one rod-shaped light conductor for emitting light, which is coupled into the at least one light conductor. The light source of the rod-shaped light conductor is preferably also designed as a semiconductor light source, in particular in form of at least one light emitting diode (LED). Thus, the at least one block optics and the at least one rod-shaped light conductor include separate light sources, so that they can send out light independent from each other and can produce the light or lamp functions which they are intended for. This is independent from the activation/deactivation of the light sources as well as the color of the emitted light from the light sources.

In one embodiment, the at least one rod-shaped light conductor is arranged relative to the at least one block optics in such a way that light from the at least one block optics is coupled into the at least one rod-shaped light conductor. If the rod-shaped light conductor includes its own light source, then the intensity of the emitted light can be increased by activating the light source of the rod-shaped light conductor at the same time. In this way, it is also possible that the area illuminated by the block optics for producing light or lamp functions is increased while the light source of the rod-shaped light conductor is deactivated or nonexistent.

In one embodiment, the at least one rod-shaped light conductor is arranged relative to the at least one block optics in such a way that light from the at least one rod-shaped light conductor is coupled into the at least one block optics. In this way, the intensity of the emitted light in it can be increased when the light source of the block optics is activated at the same time.

In the lighting device of the present invention, the block optics and the rod-shaped light conductor can emit light in different colors. When light is mutually coupled-in between the light conductor and the block optics, a mixing of colors may occur in the light conductor or in the block optics. Negative effects can be prevented in that the light source which couples-in the light is dimmed accordingly, so that the resulting color of the emitted light, after the colors of the light have been mixed, still meet the government-mandated requirements. Further, the light conductor (for example, a rear light) could produce red light and the block optics (for example, an indicator light) could produce yellow light. If both if the optics emit light, then the color-mixing will produce a reddish colored yellow light (or reddish orange) in the block optics, and a yellowy brightened reddish light in the light conductor. The emitted yellowy brightened reddish light emitted from the rod-shaped light conductor could still meet the government-regulated requirements of the light color, despite of the additional yellow proportion. However, the orange light emitted from the block optics could include an unacceptably high proportion of red. In order to bring the emitted light of the block optics back into the acceptable color range, it would be possible to dim the light source of the rod-shaped light conductor which emits red light. The same could be accomplished if optical filters were arranged between the light conductor and the adjacent block optics, which would only allow light of certain wave length to pass from the one into the other optics.

In one embodiment of the invention, a background of the lighting device (when viewed against the main light output direction of the lighting device) is designed to be mirrored, vaporized, or patterned. The pattern could include decoration lines, for example. In this way, the appearance of the lighting device can be changed for an observer, in particular when the light sources are switched off. Specifically, shading, matting, mirroring, or any desired patterning of the background is possible. The light or lamp functions of the lighting device are not affected by this, since these are produced by the light conductor arrangement (the block optics and rod-shaped light conductor, as discussed above).

BRIEF DESCRIPTION OF THE DRAWINGS

Other objects, features, and advantages of the present invention will be readily appreciated as the same becomes better understood after reading the subsequent description taken in connection with the accompanying drawing wherein.

DETAILED DESCRIPTION OF THE INVENTION

Figure 1A:
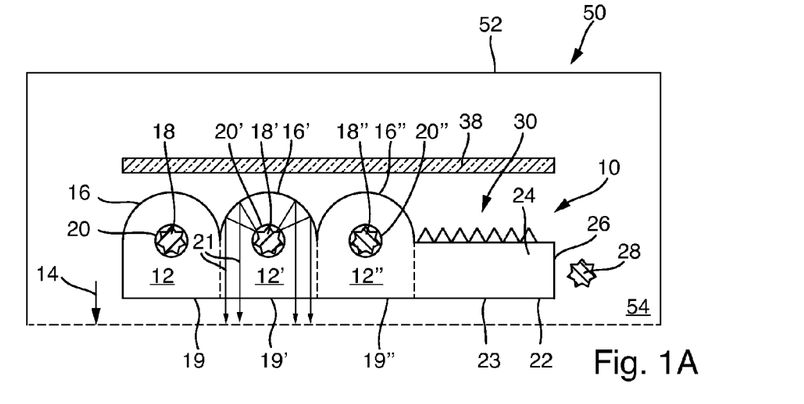
FIG. 1A shows a top view of a lighting device according to the invention with a light conductor arrangement in a first embodiment and in a first operating mode.
Figure 1B:
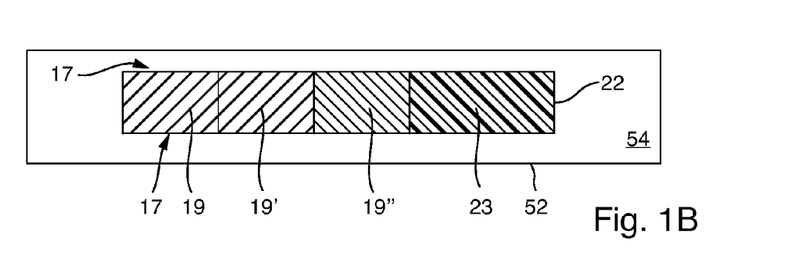
FIG. 1B shows a front view of a lighting device according to the invention with a light conductor arrangement in a first embodiment and in a first operating mode.

Referring now to the figures, the lighting device of the invention is referred to in its entirety with reference sign 50 in FIGS. 1A-1B. The lighting device 50 is depicted in top view (FIG. 1A) and in a frontal view (FIG. 1B), opposite to the light output direction 14. The lighting device 50 can be designed as a front lamp, rear lamp, also as headlight in a motor vehicle. In the example of FIGS. 1A-1B, the lighting device 50 is designed as a rear lamp and includes a housing 52, which is preferably made out of a translucent material, in particular of plastic material. In light output direction 14, the housing 52 includes a light aperture covered by a cover screen 54. The cover screen 54 may be made of a transparent material, in particular glass or plastic. The screen 54 may be glued into the light aperture onto the housing 52. Within certain sectors, cover screen 54 may include optical diffuser elements (for example, cylinder lenses or prisms) to diffuse the light that is passing through, at least in horizontal direction (so-called diffuser lens 54). Alternatively, the cover screen 54 can also be arranged without optical diffuser elements (so-called clear lens 54).

A light conductor arrangement 10 is arranged inside of the housing 52 and can be arranged into the housing 52 alone or together with one or several other light modules (not shown, but generally known in the art) intended for producing any desired light function (for example, indicator light, position light, parking light, side marker light, daytime running light, reverse light, rear light, etc.). If the lighting device 50 is designed as a headlight, the light conductor arrangement 10 can also be arranged within housing 52 together with one or several headlight modules (not depicted), which are arranged for producing any desired driving light function (for example, low beam light, high beam light, partial main beam light, marking light, fog light, curve light, adaptive high beam light, etc.), and/or with one or more other light modules (not depicted), which are intended for producing any desired light function.

In FIGS. 1A-1B, a light conductor arrangement 10 is depicted in a first embodiment and includes three block optics 12; 12'; 12' directly adjoined to each other in one row. All three block optics 12; 12'; 12" are designed identically. The amount of block optics 12; 12'; 12" can differ from three, at least one of the block optics 12; 12'; 12" could also be designed in a different way with regards to the others.

The depicted block optics 12; 12'; 12" are each designed as a plate-shaped light conductor. Each one of the plate-shaped light conductors includes two substantially parallel boundary surfaces 17 arranged opposite to each other at a certain distance, which form an upper and a lower side of the block optics 12; 12'; 12". At these boundary surfaces 17, the light which is coupled into block optics 12; 12'; 12" is reflected by a total internal reflection. A deepening is arranged in at least one of the boundary surfaces 17, in which at least one light source 18; 18'; 18" is arranged. The light source 18 may include one or more semiconductor light sources, in particular light emitting diodes (LEDs). At least part of a wall of the deepening forms the light incidence area 20; 20'; 20" for the light emitted from the at least one light source 18; 18'; 18". Each one of the plate-shaped light conductors 12; 12'; 12" further includes a totally reflective light coupling-out area 16; 16'; 16", which extends at least over part of an intermediate area between the boundary surfaces 17, and which thus forms at least one side surface of the block optics 12; 12'; 12". As shown in FIG. 1A, the light coupling-out area 16; 16'; 16" can be arranged in the shape of a parabola or of a segment of a circle or of a segment of an ellipse or of any other free-form. The light source(s) 18; 18'; 18" are preferably arranged within a focal point (or center point) of the light coupling-out area 16; 16'; 16". The plate-shaped light conductor 12; 12'; 12" also includes a light coupling-out area 19; 19'; 19", which extends at least over another part of the intermediate area, and which thus forms at least another side surface of the block optics 12; 12'; 12". The light coupling-out area 19; 19'; 19" is arranged opposite to at least part of the coupling-out area 16; 16'; 16".

The different block optics 12; 12'; 12" are depicted in FIGS. 1A-1B separated by a dotted line. The block optics 12; 12'; 12" can be produced as separate, individually formed elements, in particular as transparent elements made of glass or plastic material. Alternatively, the block optics 12; 12'; 12" can be made out of one common element, in particular a transparent element made of glass or plastic material. The light coupling-out area 16; 16'; 16" can feature an even shape. Alternatively, the light coupling-out area 16; 16'; 16" can feature a triangular or a convexly curved shape in a vertical longitudinal section through the block optics 12; 12'; 12".

The light that is coupled into the block optics 12; 12'; 12" is reflected at the boundary surfaces 17 and the side surfaces in the intermediate areas between the boundary surfaces 17 by total internal reflection, and is subsequently sent into in the direction of the light coupling-out area 19; 19'; 19" via the light coupling-out area 16; 16'; 16" of block optics 12; 12'; 12". As an example, light source 18' of the middle block optics 12' is in operation in FIGS. 1A-1B. The corresponding course of the light rays 21 is indicated.

The light sources 12 and 12' in FIGS. 1A-1B are arranged for emitting yellow light, block optics 12" is arranged for emitting red light. Therefore, they shine in different colors at the light output area 22 of the overall light conductor arrangement 10, which is displayed in the lower depiction of FIGS. 1A-1B, whereas the light coupling-out areas 19, 19', 19" of the block optics 12, 12', 12" and the light output area 23 of the rod-shaped light conductor 23 are depicted in a view opposite to the light output direction 14.

The block optics 12, 12', 12" are particularly designed for an efficient coupling-in of light and for producing large, especially homogeneously illuminated light coupling-out areas 19, 19', 19". However, the block optics 12, 12', 12" may not illuminate an area sufficiently homogeneous in certain situations. For example, with an arched or curved block optics 12, 12', 12" with ring-shaped or ring section-shaped light coupling-out areas 19; 19'; 19", the coupled-in light is collected within the area of the outer boundary surface 17, so that it results in inhomogeneously illuminated light coupling-out areas 19, 19', 19" and particularly a brightly illuminated outer edge area, when viewed from the front (see FIG. 1B). Further, the possible radii of an arched or curved block optics 12; 12'; 12" are very limited, because when the curvature is too tight (small radius), it is not possible to ensure a propagation of the coupled-in light. Instead, the light would be coupled-out of the intensely curved block optics 12; 12'; 12".

Figure 11:
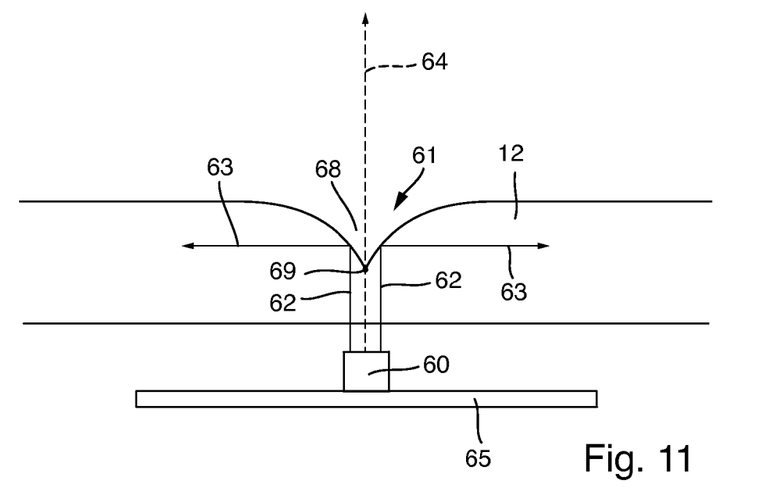
FIG. 11 depicts on coupling-in location for block optics.
Figure 12:
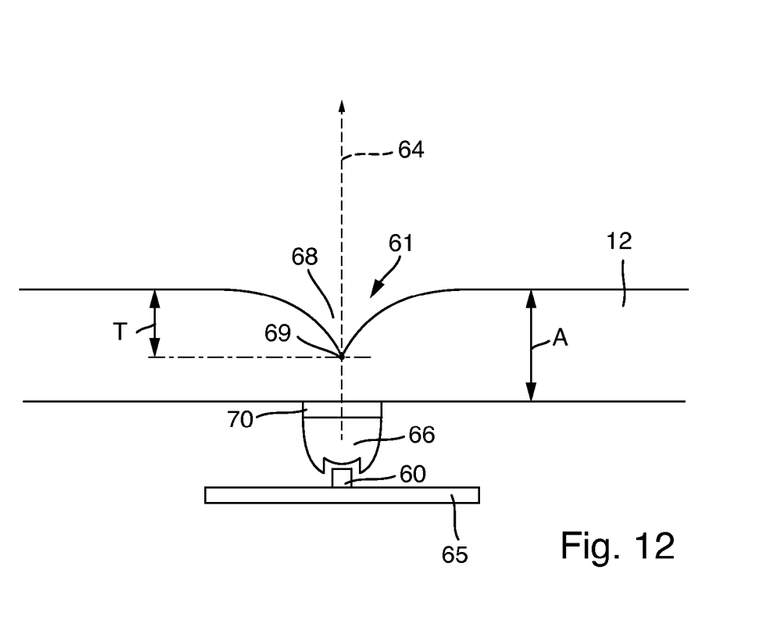
FIG. 12 depicts another coupling-in location for block optics.

FIGS. 11 and 12 depict possible embodiments of the block optics 12; 12'; 12" in the area of their coupling-in section. In the coupling-in section depicted in FIG. 11, a deepening 68 is formed in a boundary surface 17 of the block optics 12; 12'; 12". It forms an optical deflector 61 for the light 62 that is coupled into block optics 12; 12'; 12". The light is coupled into block optics 12; 12'; 12" via a coupling-in location in the boundary surface 17 which is on the opposite side of the optical deflector 61, with the deepening 68 on the opposite side of the boundary surface 17. A light source (for example, an LED) 60 is positioned outside of the lower boundary surface 17 with the coupling-in location, whereby a main direction of the beam 64 of LED 60 is directed onto the deepening 68, in particular onto the center 69 of the deepening 68. The upwardly radiated light 62 of LED 60 is being coupled into block optics 12; 12'; 12" via the lower boundary surface 17, and is subsequently directed into the layer of the block optics 12, 12', 12" (light rays 63) by the optical deflector 61.

The optical deflector 61 may be made by rotating the section of a parabola or of a slightly different curvature, which originates in a parabola whose focal point is located in the center of light source 60. The rotation is performed around the main direction of the beam 64 of LED 60. For the shape of the block light conductor 12, 12', 12" to be formed in a more flexible way, a coupling-in location is needed (located on the lower boundary surface 17) that allows a certain distance between a flat circuit board 65 (on which the LED 60 is mounted) and the block optics 12, 12', 12". The light of LED 60 is preferably focused with a catadioptric (TIR) optical lens 66 (see FIG. 12) and is coupled into the block optics 12, 12', 12" via light conductor section 70, if necessary. It is also possible that the optical lens 66 could be arranged and mounted on the circuit board 65 of LED 60. When an optical lens 66 is used, it is possible that the light from LED 60 is focused in such a way, that the optical deflector 61 can be made in the shape of a deepening 68 in the area of the coupling-in section in order to deflect the light rays 62, 63, having the form of a cone. The tip 69 of the optical deflector 61 is preferably located in a depth T, which at most corresponds to half of a distance A to a boundary surface 17 located on the opposite side of the block optics 12, 12', 12".

The coupling-in section may advantageously include the coupling-in location on a first boundary surface 17, whereby light 62 of LED 60 is coupled into the block optics 12; 12'; 12", and the optical deflector 61 on the second boundary surface 17 on the opposite side, which deflects the coupled-in light 62 into the layer of the block optics 12; 12'; 12" (light rays 63).

In order to achieve a light conductor arrangement 10, in which it is not only possible to produce particularly homogeneously illuminated light coupling-out areas 19, 19', 19" with the block optics 12, 12', 12" in a highly efficient way, but which can also guarantee a particularly high flexibility with regards to its shape and course of the entire illuminated area 20 of the light conductor arrangement 10, and a which has a high efficiency even if the areas 20 are heavily arched or curved, it is suggested that a rod-shaped light conductor 24 is arranged at the right side of block optics 12".

Figure 2A:
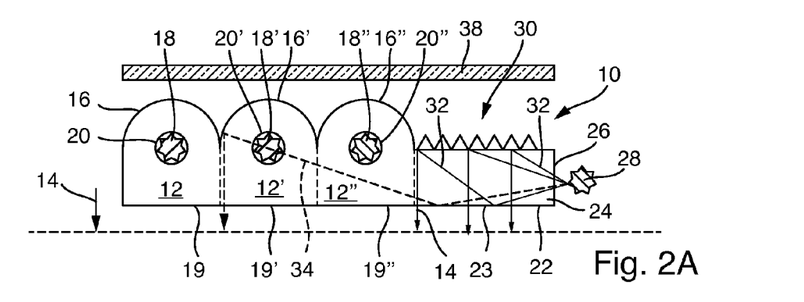
FIG. 2A shows a top view of the light conductor arrangement of FIGS. 1A-1B in another operating mode.
Figure 2B:
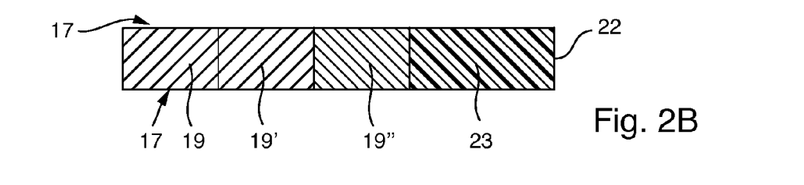
FIG. 2B shows a front view of the light conductor arrangement of FIGS. 1A-1B in another operating mode.

As shown in FIGS. 1A-1B, the rod-shaped light conductor 24 may include a light coupling-in area 26 on one end face of light conductor 24, pointing away from block optics 12'. It will be appreciated that the block optics 12, 12', 12" and the rod-shaped light conductor 24 could be designed as separate elements. Alternatively, block optics 12, 12', 12" or at least the block optics 12" facing the light conductor 24 and the light conductor 24 could be designed as an integral element. A light source 28 assigned to light conductor 24 is arranged in front of light coupling-in area 26. The light source 24 is preferably a semiconductor light source, in particular one or more light emitting diodes (LEDs). The light which is coupled into light conductor 24 is propagated along the boundary surfaces of light conductor 24 by total internal reflection. A respective course of the light rays 32 that are emitted from light source 28 is depicted in FIGS. 2A-2B, as an example. The light conductor 24 includes light coupling-out elements 30 along its entire longitudinal extension, or along parts of it. The light coupling-out elements 30 deflect the light that was coupled into the rod-shaped light conductor 24 into the direction of a light output area 23 of the rod-shaped light conductor 24. The light coupling-out areas 19, 19', 19" of the block optics 12, 12', 12" and the light output area 23 of the rod-shaped light conductor 24 together form a common output area 22 of the overall light conductor arrangement 10.

The emitted light of light conductor 24 can be used for producing a lamp function, for example, a rear light. To that end, light source 28 preferably emits red light. The rod-shaped light conductor 24 can be constructed as one integral element along with the block optics 12, 12', 12" or at least with the block optics 12" on the side of the light conductor 24. Alternatively, the light conductor 24 can be constructed as an individual element, separate from the block optics 12, 12', 12". In such a case, light conductor 24 is preferably arranged close to the right block optics 12", such that light from the block optics 12, 12', 12" can penetrate into light conductor 24 and possibly also the other way around, wherein light from the light conductor 24 can penetrate at least into one of the block optics 12, 12', 12".

As indicated by the dashed light ray 34 in FIGS. 2A-2B, light coupled into light conductor 24 can propagate throughout the entire light conductor 24 and, thereafter, couple into the block optics 12, 12', 12". In FIGS. 2A-2B, a light ray 34 reaches into the light coupling-out area 16' in the middle block optics 12' and is deflected towards the front, onto the light coupling-out area 19' and is subsequently coupled-out thereby. It will be appreciated that the same effect occurs in the other block optics 12, 12". Moreover, this effect can increase the light intensity of the respective block optics 12, 12', 12".

It will be appreciated that the respective block optics (here 12') and the light conductor 24 can send out light in different colors, as discussed above. When light is mutually coupled-in, there is a mixing of colors within the block optics 12', whereby the color of the light emitted from block optics 12' does not (or, would no longer) meet the government-mandated requirements regarding the light color for the respective light or lamp function, because of the coupling-in of the red light of light conductor 24. This could be prevented by dimming light source 28 such that the resulting color of the light, after the light is mixed in the block optics 12', still meets the government-mandated requirements when it is emitted from the light coupling-out area 19'. Further, as an alternative for dimming light source 28, a filter could be arranged between the block optics 12" and the light conductor 24 in order to filter out light of certain wave length. Such a filter could filter out the red components of the light that penetrated into block optics 12, 12', 12".

In order to optically isolate block optics 12 from rod light conductor 24, a cut can be inserted in the transition area (for example, a groove or a notch) of the light conductor arrangement 10 in such a way that the light from the rod light conductor 24 is deflected into driving direction by total internal reflection at the end face of the rod light conductor 24. The cut is preferably inserted on the side of the light conductor arrangement 10 facing away from the driving direction. In this way, the cut is hardly visible from the outside of the motor vehicle, when the headlight 50 or the light conductor arrangement 10 is mounted, and the cross-talk of the light functions from one light conductor 12; 24 into the respective other light conductor 24; 12 is effectively eliminated. Those having ordinary skill in the art will appreciate that the opposite is possible as well, wherein light from one of the block optics 12, 12', 12" could be coupled into light conductor 24.

Depending on which light function is intended for the respective block optics 12, 12', 12" or for light conductor 24, the light color of the respective light source 18, 18', 18" and 28 can be set according to the government-mandated requirements. Thus, for example, a red color could be specified for producing a brake light or a rear light. An indicator light may have a yellow/orange color. Further, a position light at the front of the vehicle, a daytime running light, and a reverse light may have white light. Since relatively bright light functions can be produced by the block optics 12, 12', 12", they are well suited for producing an indicator light or a brake light, where a relatively high illumination is necessitated. The light emitted by the rod-shaped light conductor 24 is preferably used for producing less intensive light functions, in particular a position, a side marker, or a parking light.

Further, several block optics arranged next to each other could emit light intended for a common light function (for example, the block optics 12 and 12'). It is also possible that all the block optics 12, 12', 12" and the rod-shaped light conductor 24 are used to produce the same light function, as in the case of a lighting device 50 designed as a headlight or a daytime running light.

In FIGS. 1A-2B, a background surface 38 is arranged behind the light conductor arrangement 10, opposite to the light output direction 14. This can be an integral part of the rear panel of housing 52 or, alternatively, it can be attached as a separate cover frame on the inside of the rear panel of the housing. The background surface 28 can be for example, mirrored, matted, or patterned. The patterns may include, decoration lines, emblems (for example, "VW"), or names (for example, "Volkswagen") of the vehicle manufacturer, or names of the vehicle model (for example, "Golf"), or other descriptions of the motor vehicle such as trim level (for example, "GTI"). In this way, the appearance of the light conductor arrangement 50 can be improved for an observer, especially when the lighting device 50 is switched off.

Figure 3A:
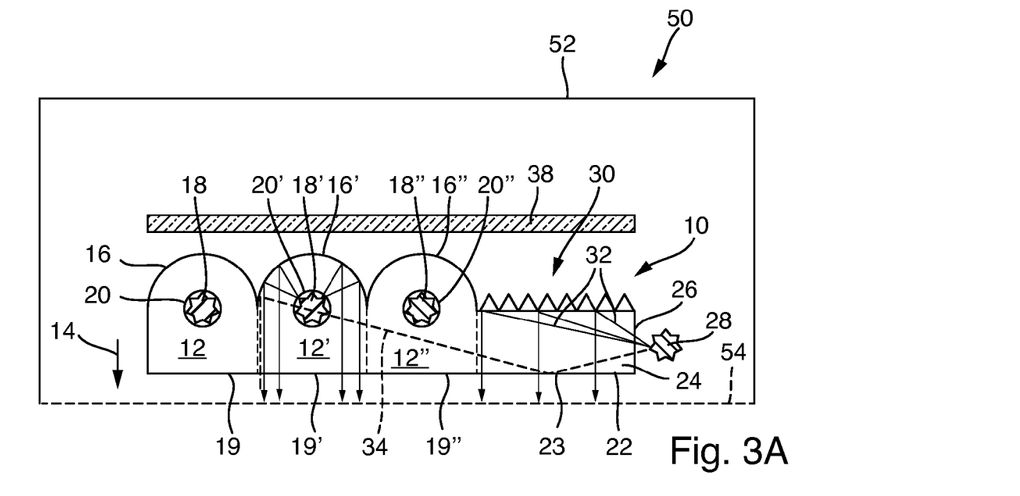
FIG. 3A shows a top view of a lighting device according to the invention with a light conductor arrangement in a second embodiment and in a first operating mode.
Figure 3B:
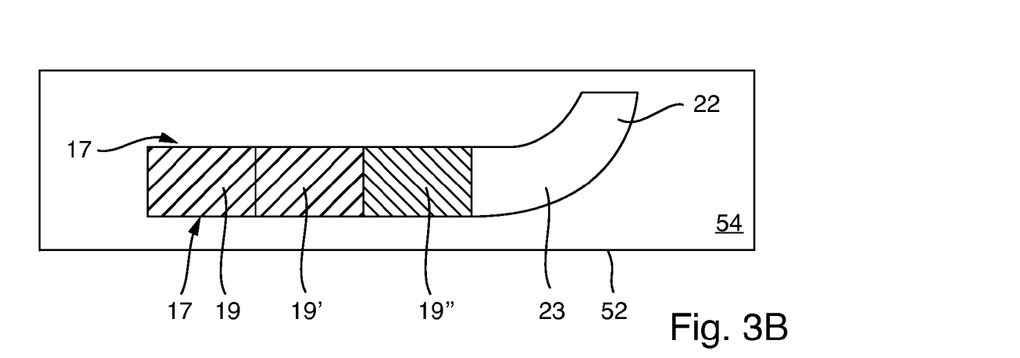
FIG. 3B shows a front view of the lighting device according to the invention with a light conductor arrangement in a second embodiment and in a first operating mode.
Figure 4:
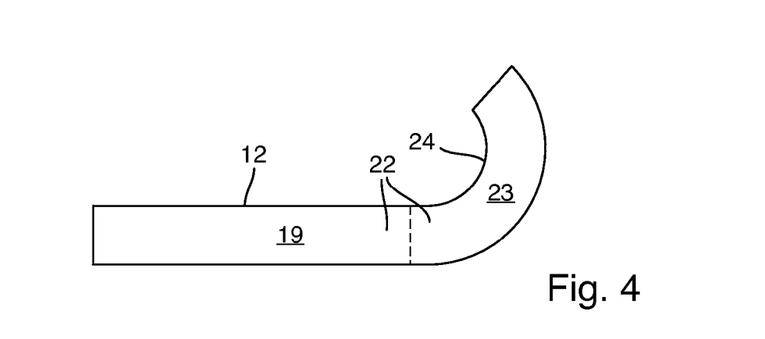
FIG. 4 shows an alternate version of the light conductor arrangement of FIGS. 1A-1B.

FIGS. 3A-3B depict a lighting device 50 with a light conductor arrangement 10 of a second embodiment. In FIGS. 3A-3B, the rod-shaped light conductor 24 is designed in such a way that the light output area 23 of light conductor 24 is bent in a plane that runs perpendicular to the main light output direction 14. In this way, it is possible that the light output area 22 of the entire light conductor 10 can transfer from a horizontal course of the light coupling-out areas 19, 19', 19" of the block optics 12, 12', 12" into a sloping or vertical course by the curvature of light conductor 24, or of its light output area 23 (when viewed from the front) opposite to the light output direction 14 (see FIG. 3B). The curvature of light conductor 24 can at least partially frame a light module of the lighting device 50 (for example, a projection lens of a projection module). To that end, the light conductor 24 can have a curvature of more than 90° (see FIG. 3B). The light conductor 24 can for example, have a curvature of 120° (see FIG. 4), or even more than that. Further, it is possible for additional block optics to be connected to the distal end of the light conductor 24 facing away from the block optics 12, 12', 12". A coupling-in of light from light conductor 24 into at least one of the block optics 12, 12', 12" can also occur in the second embodiment (see the marked light rays 34 in FIGS. 3A-3B).

Figure 5A:
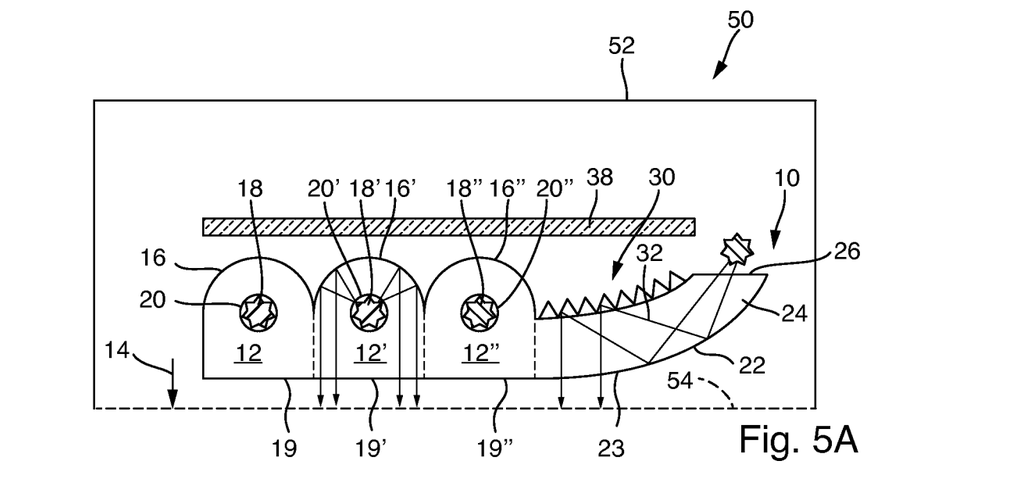
FIG. 5A shows a top view of a lighting device according to the invention with a light conductor arrangement in a third embodiment and in a first operating mode.
Figure 5B:
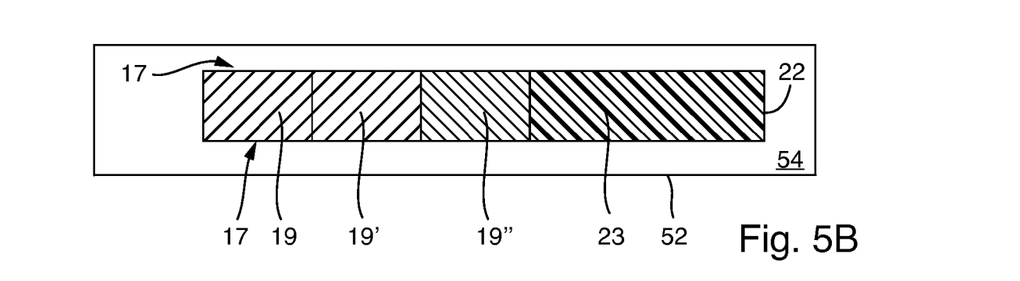
FIG. 5B shows a front view of the lighting device according to the invention with a light conductor arrangement in a third embodiment and in a first operating mode.

FIGS. 5A-5B depict the lighting device 50 with a light conductor arrangement 10 in a third embodiment. In FIGS. 5A-5B, the rod-shaped light conductor 24 is formed in such a way that the light conductor 24 is curved backwards, opposite to the light output direction 14, within the plane of the main light output direction 14. The light output here is identical to the light output depicted in FIGS. 1A-2B. In this third embodiment, a coupling-in from the light of the light conductor 24 into at least one of the block optics 12, 12', 12". The curvatures in the FIGS. 3A-5B can also be combined with each other so that a light conductor arrangement 10 is visible when viewed from the front into the lighting device 50 through the cover screen 54 (or in vertical direction), as well as backwards or forward (or in horizontal direction) where the rod-shaped light conductor 24 is arched or curved upwards or downwards.

Figure 6:
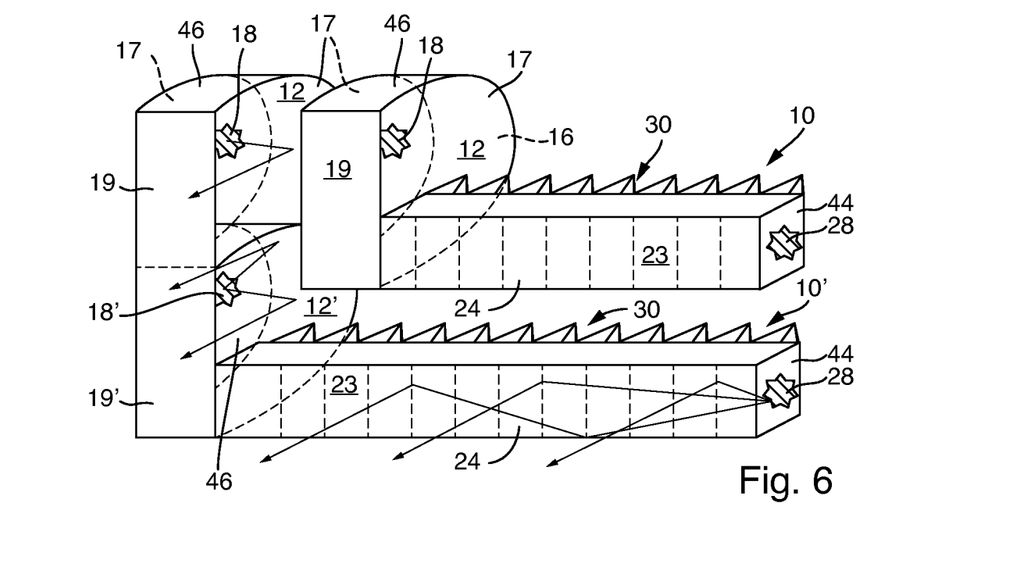
FIG. 6 shows part of a lighting device according to the invention with two L-shaped light conductor arrangements.
Figure 7:
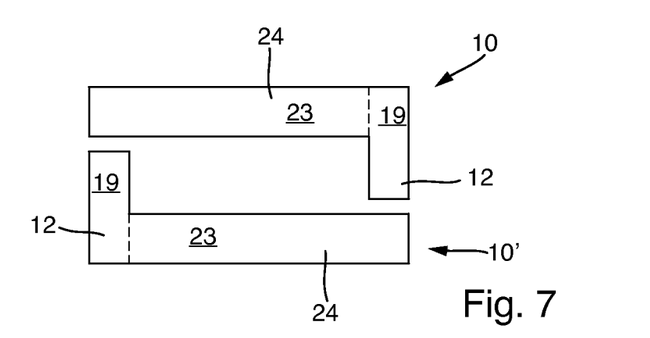
FIG. 7 shows one possible geometric design of light conductor arrangements in a lighting device according to the invention.
Figure 8:
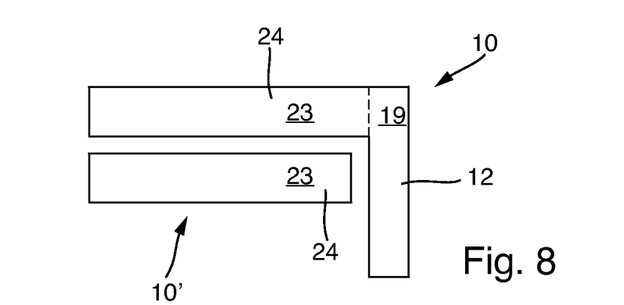
FIG. 8 shows another possible geometric design of light conductor arrangements in a lighting device according to the invention.
Figure 9:
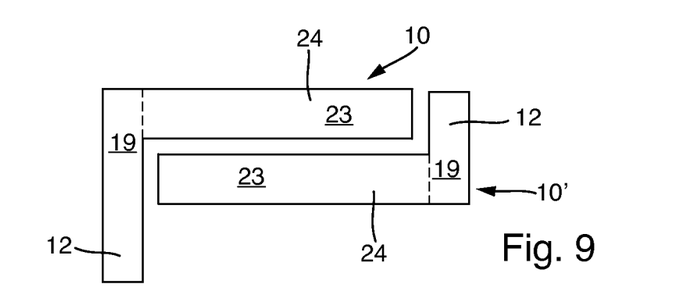
FIG. 9 shows still another possible geometric design of light conductor arrangements in a lighting device according to the invention.
Figure 10:
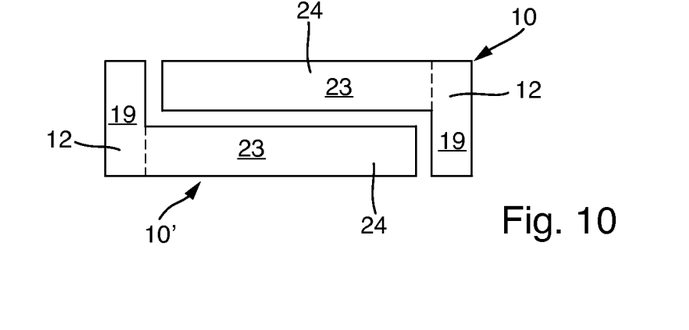
FIG. 10 shows still another possible geometric design of light conductor arrangements in a lighting device according to the invention.

FIG. 6 depicts two light conductor arrangements 10, 10' which, as discussed above, can be arranged together into one housing 52 of a lighting device 50. The light conductor arrangements 10, 10' are both designed in L-shape. Hereby, the horizontally arranged areas of the light conductor arrangement 10, 10' are constructed by a respective rod-shaped light conductor 24. The vertically arranged areas of the light conductor arrangement 10, 10' are created with one or two block optics 12 or 12'. Each one of the two light conductor arrangements 10, 10' can produce several different light functions, whereby the different light functions can be assigned to individual block optics 12, 12' or to the light conductor 24. But, it is also possible that the same light functions can be produced in both light conductor arrangements 10, 10'.

Further, possible arrangements of circuit boards 44, 46 for the electrical supply of the light sources 18, 18' and 28 are depicted in an exemplary way in FIG. 6. Circuit boards 44, 46 are typically arranged within the vicinity of the light sources 18, 18' and 28. The circuit boards 44 can be designed as one common circuit board for both light sources 28 of both light conductors 24. With the block optics 12, 12', it would be practical to arrange the respective circuit board 46 parallel to one of the boundary surfaces of the block optics 12, 12', as no light is emitted in this area and is totally internally reflected there. With such an alignment of circuit board 46, the block optics 12, 12' needs only marginally more space.

In FIG. 6, the alignment and embodiment of the two light conductor arrangements 10, 10' is depicted in an exemplified way. FIGS. 7-10 depict further possible, exemplified alignments of the light conductor arrangements 10, 10'. As shown, respective block optics 12 are intended for the vertical parts of light conductor arrangement 10, 10', whereby it is also possible that several block optics are used, adjoined to each other, in order to achieve the depicted block optics 12 or its light coupling-out areas 19. Rod-shaped light conductors 24 are preferably intended for horizontally arranged parts of the light conductor arrangement 10, 10', whereby several light conductors 24 can be arranged next to each other. Moreover, block optics 12 can be arranged horizontally and light conductor 24 vertically. Each individual optics (block optics 12 or light conductor 24) can produce a separate light function, whereby the individual optics can vary for example, in their light intensity, the light color, and the size of the light coupling-out or output areas 19, 23. Further, the amount of the respectively assigned light sources 18, 28 can be different as well.

The invention has been described in an illustrative manner. It is to be understood that the terminology which has been used is intended to be in the nature of words of description rather than of limitation. Many modifications and variations of the invention are possible in light of the above teachings. Therefore, within the scope of the appended claims, the invention may be practiced other than as specifically described.

What is claimed is:

1. A lighting device for a motor vehicle, the lighting device comprising at least one light source for emitting light and at least one plate-shaped light conductor-made in form of a block optics, the light conductor including two boundary surfaces which run opposite towards each other, a totally reflective side surface, which extends over part of the intermediate area, and which consists of a light coupling-out area, which extends over one other part of the intermediate area between the boundary surfaces, whereby a coupling-in section is formed on at least one of the boundary surfaces, wherein light from the at least one light source is coupled into the block optics and is deflected into the layer of the block optics, and where the coupled-in light is emitted via the light coupling-out area, wherein the lighting device includes at least one substantially rod-shaped light conductor with a light output area which extends along the longitudinal extension of the light conductor in addition to the at least one block optics, wherein said rod-shaped light conductor is constructed as one integral element along with the block optics and wherein said light coupling-out area of the block optics and said light output area of the rod-shaped light conductor together form a common output area of the overall lighting device, and wherein at least one additional light source is assigned to the at least one rod-shaped light conductor, for emitting light which is directly coupled into the at least one rod-shaped light conductor.

2. The lighting device as set forth in claim 1, wherein light coupling-out elements are arranged within the rod-shaped light conductor such that they couple-out light via the light output area.

3. The lighting device as set forth in claim 1, wherein the light output area of the rod-shaped light conductor is curved within the plane of the main light output direction of light conductor.

4. The lighting device as set forth in claim 1, wherein the light output area of the rod-shaped light conductor is curved within the plane running perpendicular to the main light output direction of light conductor.

5. The lighting device as set forth in claim 1, wherein the at least one rod-shaped light conductor and the at least one block optics are designed to produce different light functions.

6. The lighting device as set forth in claim 1, wherein the at least one rod-shaped light conductor is arranged relative to the at least one block optics such that light from the at least one block optics is coupled into the at least one rod-shaped light conductor.

7. The lighting device as set forth in claim 1, wherein the at least one rod-shaped light conductor is arranged relative to the at least one block optics such that light from the at least one rod-shaped light conductor is coupled into the at least one block optics.

8. The lighting device as set forth in claim 1, wherein a background of the lighting device is designed to be one of mirrored, matted, and patterned when viewed against the light output direction of the lighting device.

9. The lighting device as set forth in claim 1, wherein at least one of the light sources assigned to one of the light conductor and the block optics can be dimmed.

10. The lighting device as set forth in claim 1, wherein at least one of the at least one block optics and the at least one rod-shaped light conductor is designed for producing a lamp function.

11. The lighting device as set forth in claim 1, wherein at least one of the at least one block optics emits light in a color different from the color of the light emitted from the at least one rod-shaped light conductor.

12. The lighting device as set forth in claim 1, wherein the lighting device includes at least one of a plurality of block optics and a plurality of rod-shaped light conductors, whereby one of the block optics emits light in a color different from the color of the light emitted from the rod-shaped light conductors.

13. The lighting device as set forth in claim 1, wherein the coupling-in section includes at least one deepening arranged in at least one of the boundary surfaces, whereby at least part of a wall of the deepening forms the light incidence area for the light emitted from the at least one light source.

14. The lighting device as set forth in claim 1, wherein the coupling-in section includes an optical deflector arranged within one of the boundary surfaces and a light coupling-in location on the opposite side of the boundary surface such that light emitted from the at least one light source enters into the block optics and is there deflected into the layer of the block optics by the optical deflector.

15. A light conductor arrangement for a lighting device of a motor vehicle, comprising at least one plate-shaped light conductor made in form of a block optics and including two boundary surfaces which run opposite towards each other at a predetermined distance, a totally reflective side surface which extends over part of the intermediate area between the boundary surfaces and which includes a light output area, which extends over one other part of the intermediate area, whereby a coupling-in section is formed on at least one of the boundary surfaces, whereby light from the at least one light source is coupled into the block optics and is deflected into the layer of the block optics, and where the coupled-in light is emitted via the light coupling-out area wherein the light conductor arrangement includes at least one substantially rod-shaped light conductor with a light output area which extends along the longitudinal extension of the light conductor in addition to the at least one block optics, wherein said rod-shaped light conductor is constructed as one integral element along with the block optics and wherein said light coupling-out area of the block optics and said light output area of the rod-shaped light conductor together form a common output area of the overall light conductor arrangement, and wherein at least one additional light source is assigned to the at least on rod-shaped light conductor, for emitting light which is directly coupled into the at least one rod-shaped light conductor.

* * * * *